United States Patent [19]
Andrews et al.

[11] 4,299,117
[45] Nov. 10, 1981

[54] MULTI-FUNCTION ENGINE SENSOR

[75] Inventors: Gilman B. Andrews, Royal Oak; George W. Goodrich, Bloomfield Hills, both of Mich.

[73] Assignee: The Bendix Corporation, Southfield, Mich.

[21] Appl. No.: 96,963

[22] Filed: Nov. 23, 1979

[51] Int. Cl.³ .......................................... G01N 25/20
[52] U.S. Cl. ........................................ 73/35; 73/346; 73/347
[58] Field of Search ............... 73/661, 649, 117.3, 73/344, 345, 346, 347, 35, 714

[56] References Cited

U.S. PATENT DOCUMENTS

| | | | |
|---|---|---|---|
| 2,403,774 | 7/1946 | Whitty et al. | 73/35 |
| 2,727,389 | 12/1955 | Rose et al. | 73/345 |
| 3,439,356 | 4/1969 | Kinzer | 73/345 |
| 3,732,728 | 5/1973 | Fitzpatrick | 73/345 |
| 4,033,180 | 7/1977 | Massa | 73/649 |

*Primary Examiner*—Anthony V. Ciarlante
*Attorney, Agent, or Firm*—Russel C. Wells; John R. Benefiel

[57] ABSTRACT

A multi-function sensor for internal combustion piston engines is disclosed comprised of a sensor plug extending into an engine cooling system passage adjacent the engine cylinder and providing output signals corresponding to the engine coolant temperature, as well as pressure signals created by combustion within the engine cylinders. The sensor plug comprises a threaded cylinder having an internal open ended bore, closed off with a thin metallic sealing disc on which is bonded a piezoelectric crystal layer detecting acoustical pressure waves transmitted into the water jacket from the engine cylinders upon ignition. A disc of thermistor material is bonded atop the piezoelectric crystal to provide electrical signals corresponding to coolant temperature.

5 Claims, 2 Drawing Figures

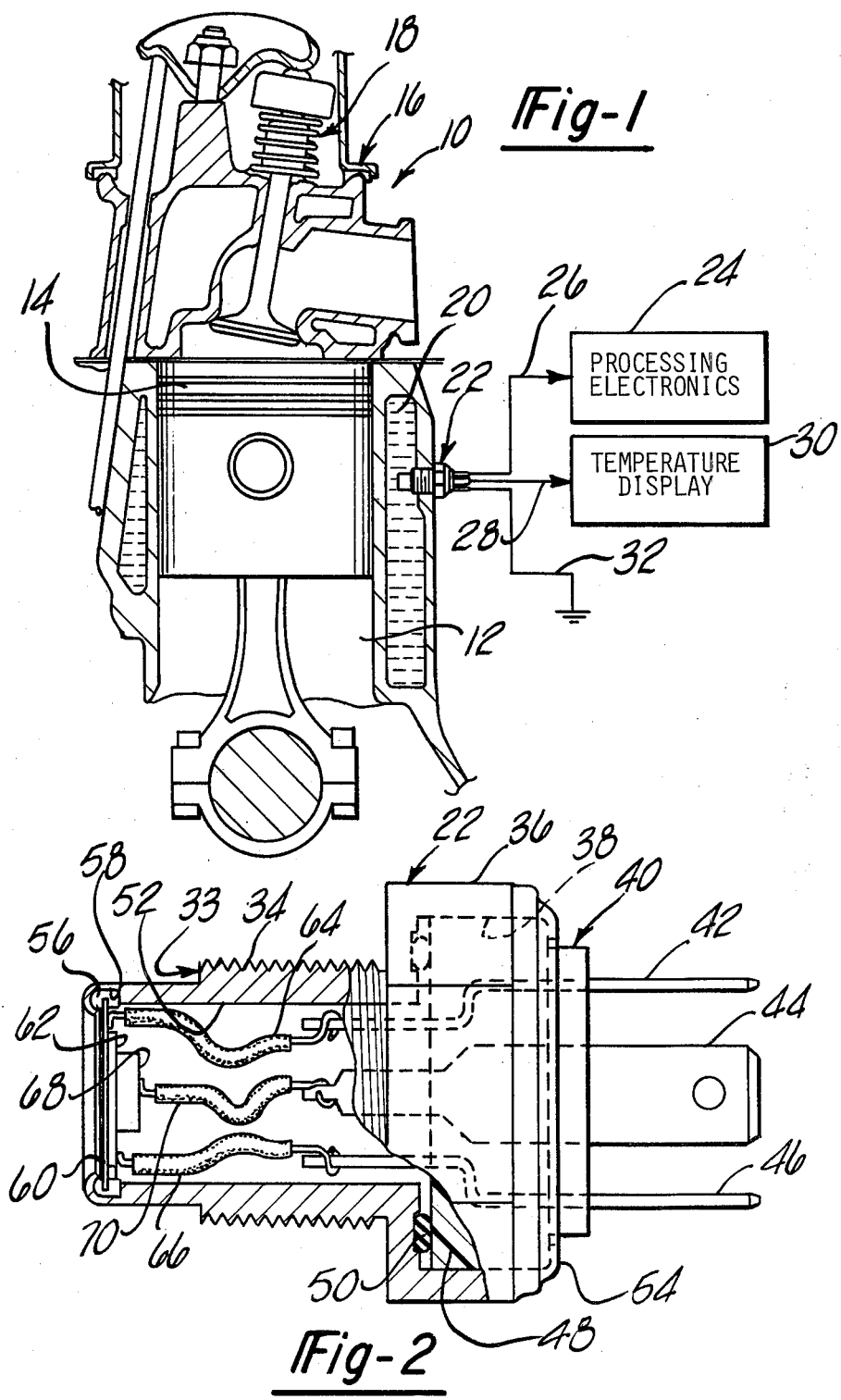

MULTI-FUNCTION ENGINE SENSOR

BACKGROUND DISCUSSION

This invention concerns internal combustion engine sensors and more particularly piston engine sensors adapted to detect ignition and combustion within the engine cylinder.

It has been recognized that the direct detection of the onset of combustion within the cylinders of internal combustion engines as well as the detection of a knock or ping would be highly useful both in controlling engine ignition timing and as a parameter signal for use in electronic fuel control systems, particularly in the case of diesel engines. Since both engine knock and the initiation of combustion within the cylinder are detectable by the sensing of acoustical waves generated by the combustion in the engine cylinders, it has heretofore been proposed to detect combustion and/or knock by sensing pressure waves.

In U.S. Pat. No. 2,403,774, there is disclosed the concept of detecting the generation of such acoustic waves by means of a microphone disposed directly within the water jacket or other portion of the engine coolant system. The liquid coolant very effectively creates a coupling between the microphone and the engine structure, such that the acoustic energy will very efficiently excite the microphone, for the disclosed purpose of detecting engine knock or ping.

As noted, the hydrophone pressure or acoustic wave detection is also useful in providing a signal corresponding to the actual onset of ignition for timing and fuel control purposes in internal combustion engines.

A major factor in the adoption of any such device to automotive internal combustion engines is the cost of utilizing such a sensor, in view of the vastness of auto production volumes. The cost of providing such sensors arises from the manufacture of the component itself and in the expense of installation into the engine.

Internal combustion engines usually incorporate several conventional sensor functions, such as water temperature and oil pressure sensors. If such pressure wave sensor was combined with other such sensors, a substantial reduction in costs attributable to the hydrophone sensor itself could be realized.

Accordingly, it is an object of the present invention to provide a multi-function engine sensor which includes a hydrophone or acoustic pressure wave sensor for use with internal combustion piston engines.

It is a further object of the present invention to provide an internal combustion engine sensor providing an electrical output signal corresponding to the onset of combustion within the engine cylinders at minimum cost.

SUMMARY OF THE INVENTION

These and other objects of the present invention, which will become apparent upon a reading of the following specification and claims, are achieved by a multi-function engine sensor in which the hydrophone is contained in a sensor plug which is mountable so as to extend into a coolant passage of a cooling jacket associated with the engine cylinder head or block in proximity to the engine cylinder such as to detect acoustic waves propagated into the coolant by combustion in the engine cylinders. The sensor also provides a capability for generating electrical signals corresponding to engine coolant temperatures such as to reduce the net cost of the hydrophone sensors as well as to simplify the installation thereby by the combination with the temperature sensor.

The sensor plug configuration includes a sensor plug body being threadable into an opening entering into an engine water jacket, and having a through internal bore, the end of which is sealed off by a thin metallic sealing disc to which is bonded or otherwise secured a pressure sensitive layer, such as a piezoelectric crystal.

Atop the pressure sensitive layer is a disc of thermistor material provided for the coolant temperature sensing function. Appropriate electrical connections are made with the respective layers such as to provide electrical signals corresponding to the acoustic pressure waves, as well as signals corresponding to the engine coolant temperature sensed by variations in the resistivity in the thermistor material.

DESCRIPTION OF THE DRAWINGS

FIG. 1 is a transverse sectional view of an internal combustion piston engine depicting the installation of the multi-function engine sensor according to the present invention and a diagrammatic representation of the electrical connections thereto.

FIG. 2 is a partially sectional view of the multi-function engine sensor depicted in FIG. 2 in enlarged view depicting the internal details thereof.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, a multi-function engine sensor is provided which includes a hydrophone or pressure wave sensor which will detect acoustic waves propagated into the engine coolant system passages adjacent the engine cylinders.

This arrangement is depicted in FIG. 1 which internal combustion engine 10 is shown in partial section which may have a number of cylinders 12, within which are disposed the engine pistons 14, and the cylinder heads 16 mounting the valves 18 in conventional fashion.

Surrounding the engine cylinder are coolant passages 20 included in the surrounding water jacket, within which is circulated a liquid coolant by the engine coolant supply system.

According to the concept of the present invention, a multi-function sensor 22 is provided which is mounted so as to extend into a water jacket coolant passage 20 and which generates electrical output signals corresponding to the onset of combustion within each engine cylinder or the development of a knock or "ping" within the cylinders. These signals may be transmitted over line 26 to be utilized in processing electronics 24 such as on the engine ignition or fuel control system.

The sensor 22 also generates signals corresponding to engine coolant temperature and transmitted over line 28 to a temperature indicator display 30.

A common ground line 32 may also be provided.

The mounting of a hydrophone or pressure sensor within the water jacket coolant passage 20 provides efficient coupling between the engine block structure adjacent the engine cylinders 12 to transmit acoustic waves into the liquid coolant medium and into the sensor 22, and at the same time this installation provides a flow of coolant liquid about the sensor 22 which cools and protects the sensor 22.

It has been determined that such an arrangement of a hydrophone adjacent an engine cylinder 12 can accurately detect the rapid pressure rise in each cylinder associated with the onset of combustion and/or the development of knock as a result of the pressure waves generated propagating into the surrounding coolant.

A single such hydrophone can be employed to detect the onset of combustion or the development of knock in each of the engine cylinders since a comparison of the relative attenuation of such signals will determine the relationship of the signals to each cylinder in a multicylinder engine.

Referring to FIG. 2, the details of construction of the multi-function sensor 22 according to the present invention are depicted. The sensor 22 includes a sensor plug body 33 including a generally cylindrical section 34 provided with the pipe thread, to be threadedly received within an opening in the sidewall of the water jacket coolant passage 20 to afford a dry seal connection.

The sensor plug body 33 is also provided with an enlarged section 36 having an internal cavity 38 in which is mounted an electrical connector assembly 40 including three electrical connector blades 42, 44 and 46 molded into a connector body 48. The connector body 48 is molded in place within an interior cylindrical bore 52 and secured by tabs 54.

A seal 50 seals the interior cylindrical bore 52, preventing the entrance of contaminants such as water, dirt, etc.

The interior cylindrical bore 52 extends through the cylindrical section 34 of the sensor plug body 33 and the end of which protrudes into the water jacket coolant passage 20 and is closed off by means of an electrically insulating seal 56 secured in a seal recess 58, and a sealing disc 60 which is preferably of a thin metallic construction having good thermal conductivity such as brass or aluminum.

Bonded to the inside surface of the sealing disc 60 is a piezoelectric crystal layer 62 which acts as the acoustic pressure sensing hydrophone element. The piezoelectric crystal layer 62 is provided with thin metallic electrodes applied to its two planar surfaces in a known manner. The acoustic energy transmitted into the coolant within the water jacket coolant passage 20 is coupled effectively to the sealing disc 60 which in turn stresses the piezoelectric crystal layer 62 in a known manner to provide an output voltage signal corresponding to the variations in pressure within the water jacket coolant passage 20.

A first electrical lead 64 is provided connected to electrical connector blade 42 in turn connected to line 26 which is soldered or otherwise secured to the inside surface so as to be electrically connected to one electrode of the piezoelectric crystal layer 62.

Connected to the other electrode of the piezoelectric crystal 62 is a grounding lead 66 which in turn is connected to the electrical connector blade 46 connected to ground line 32.

Bonded to the inside edge of the piezoelectric crystal layer 62 is a disc 68 of thermistor material, the resistance of which is temperature dependent in a known manner such that the resistivity thereof changes with changing temperatures. The thermal conductivity of the sealing disc 60 and piezoelectric crystal layer 62 causes the thermistor disc 68 to be at substantially the same temperature as the liquid coolant.

A temperature sensor lead 70 is connected to the central blade 44 of the electrical connector and in turn connected to line 28 (FIG. 1) to thereby connect the thermistor disc 68 to the temperature indicator display 30. The grounding lead 66 acts as ground for both sensors such that a common ground lead is provided.

The pressure sensor can be advantageously provided by a number of suitable materials and a relatively low cost such as the piezoelectric crystal layer described or alternatively barium titanite ceramic hydrophone.

It can therefore be appreciated that the above-recited objects have been achieved since two functions are combined in a single sensor plug body, enabling effective detection of both engine temperature and the acoustic pressure waves associated with combustion. This provides a relatively lower cost installation for each sensor capability.

The sensor configuration is simple and reliable to further minimize costs associated with the device.

The embodiments of the invention in which an exclusive property or privilege is claimed are defined as follows:

1. A multi-function engine sensor comprising:
   a sensor body having an internal bore formed therein;
   a sealing disc closing off said internal bore;
   an acoustic pressure sensor having a surface mounted to the interior surface of said sealing disc;
   a temperature sensor mounted to a surface of said acoustic pressure sensor remote from said surface mounted to said sealing disc;
   first, second and third electrical leads connected respectively to the interior surface of said sealing disc, to said acoustic pressure sensor surface mounted to said temperature sensor, and to said temperature sensor on a surface remote from said one surface, whereby acoustic pressure and temperature sensor are provided.

2. The multi-function engine sensor according to claim 1 wherein said acoustic pressure sensor comprises a piezoelectrical crystal layer bonded to said sealing disc.

3. The multi-function engine sensor according to claim 2 wherein said sealing disc is metallic.

4. The multi-function engine sensor according to claim 2 wherein said temperature sensor comprises a disc of thermistor material.

5. The multi-function engine sensor according to claim 4 wherein said sealing disc is metallic.

* * * * *